United States Patent [19]

Moser et al.

[11] Patent Number: 4,792,123

[45] Date of Patent: Dec. 20, 1988

[54] METALLURGICAL PLANT

[75] Inventors: Peter Moser, Linz; Alfred Weber, St. Georgen; Aglas Johann, Hofkirchen; Johann Poperahatzky, Neufurth; Georg Stastny, St. Georgen, all of Austria

[73] Assignee: Voest-Alpine Aktiengesellschaft, Linz, Austria

[21] Appl. No.: 33,752

[22] Filed: Apr. 3, 1987

[30] Foreign Application Priority Data

Apr. 30, 1986 [AT] Austria .................................. 1164/86

[51] Int. Cl.$^4$ ................................................. C21C 5/38
[52] U.S. Cl. ...................................... 266/142; 266/158
[58] Field of Search ............... 266/142, 143, 158, 159; 373/8, 9

[56] References Cited

U.S. PATENT DOCUMENTS

| | | | |
|---|---|---|---|
| 4,395,023 | 7/1983 | Tomizawa et al. | 266/158 |
| 4,410,166 | 10/1983 | Hixenbaugh et al. | 373/9 |
| 4,506,370 | 3/1985 | Yoshimatsu | 373/9 |
| 4,638,487 | 11/1987 | Tomizawa et al. | 266/158 |

OTHER PUBLICATIONS

Karl Grubert el al., "Einsatz enger Elektroofen-Einhausungen zur Abgaserfassung und Lärmminderung", Stahl u. Eisen 104 (1984), No. 5, pp. 235–239.

Primary Examiner—John P. Sheehan
Assistant Examiner—S. Kastler
Attorney, Agent, or Firm—Kurt Kelman

[57] ABSTRACT

A metallurgical plant comprises a tiltable metallurgical vessel (1) and an enclosure surrounding said vessel. The vessel is provided with a cover (6), which is adapted to be lifted and to be horizontally pivotally moved away from the vessel (1) so as to permit the vessel to be charged by means of a charging box (5), which is suspended from a charging crane disposed outside the enclosure. To simplify the access to the metallurgical vessel (1) and substantially to prevent or minimize an escape of flue gas from the enclosure, a charging opening (8) which is adapted to be closed, is formed in the enclosure in a side wall (2) thereof which extends transversely to the horizontal axis about which the vessel (1) is tiltable, and the enclosure is formed in its top wall (4) with a top wall opening (11), which opens into the charging opening (8) and extends from the latter in the direction of said horizontal axis and is adapted to receive the crane ropes (10).

1 Claim, 5 Drawing Sheets

METALLURGICAL PLANT

BACKGROUND OF THE INVENTION

1. Field of the Invention

This invention relates to a metallurgical plant comprising an enclosure and in said enclosure a metallurgical vessel, which is mounted to be tilted about a horizontal axis and is provided with a cover that is adapted to be lifted and is horizontally pivotally movable from the vessel so that the latter can be charged by means of a charging box, which is suspended by means of ropes from a charging crane that is disposed outside the enclosure. The enclosure is formed in a side wall with a charging opening, which is adapted to be closed. The charging box is adapted to enter the enclosure through said charging opening. The enclosure has a top wall in which a top wall opening extends from and is open to the charging opening. Said top wall opening is adapted to be closed and when open permits the ropes of the charging crane to move in said top opening at least as far as to the vertical center line of the vessel. A space for receiving the charging box while the cover of the vessel is being opened and closed is provided between the vessel and that side wall which is formed with the charging opening.

2. Description of the Prior Art

It is known (Grubert, K.; Haering, H. U.; Marchand, D.; Muth, S.: Einsatz enger Elektroofen-Einhausungen zur Abgaserfassung und Lärmminderung, Stahl und Eisen 104 (1984), No. 5, pages 235 to 239) that the pollution caused by an evolution of flue gas during the charging of a metallurgical vessel, particularly an electric furnace, can be limited in that the electric furnace is surrounded by an enclosure, which provides between the furnace and a side wall formed with a charging opening a space which is adapted to receive a charging box, which by means of a charging crane disposed outside the enclosure can be moved through the charging opening in said side wall to a waiting position. The enclosure can then substantially be closed and thereafter the cover of the furnace can be lifted and can be horizontally pivotally moved away from the furnace vessel so that the latter can be charged from the charging box. In such plants the flue gases being evolved can be sucked inside the enclosure and the charging opening in the side wall of the enclosure needs to be opened only when the furnace is closed by its cover. Because the charging box when in waiting position will be disposed in front of the slag door of the furnace, on the side which is opposite to the tap hole, the slag door is not accessible from the outside of the enclosure but an access to the furnace is possible only from a walk-in access chamber, which is disposed within the enclosure and has swing doors opening toward the furnace. The provision of that chamber increases the structural expenditure and renders the access to the furnace more difficult. Besides, when the charging box is suspended from a suspension tackle and the ropes of the charging crane are connected to the suspension tackle at points which are spaced a relatively large distance apart in the direction of the horizontal axis about which the electric furnace is tiltable, the top wall must be formed with a top wall opening which is open to and extends from the charging opening at least as far as to the vertical center line of the vessel. Said top wall opening serves to receive the ropes of the charging crane and must have a width which exceeds the distance between the crane ropes. As a result, there is a relatively large opening in the top wall of the enclosure when the charging box is in its waiting and charging positions, even though the top wall opening can be closed in part of its length.

SUMMARY OF THE INVENTION

It is an object of the invention to avoid the disadvantages outlined herinbefore and so to improve a metallurgical plant of the kind described first hereinbefore that its advantages are preserved, an escape of flue gas from the enclosure is substantially avoided, and the metallurgical vessel is readily accessible from the outside of the enclosure.

That object is accomplished in accordance with the invention in that the side wall that is formed with the charging opening extends transversely to the horizontal axis about which the vessel is tiltable and the top wall opening for receiving the crane ropes extends in the direction of said horizontal axis.

Because the charging box is moved into the enclosure in the direction of the horizontal axis of the vessel, the charging box can assume a waiting position beside the metallurgical vessel so that, e.g., the side wall disposed adjacent to the slag door of a furnace which constitutes the vessel may be closely spaced from such furnace and may be provided with a suitable door for an access from the outside of the enclosure. Besides, the metallurgical vessel can be arranged in a foundry shop in such a manner that the suspension tackle of the charging crane will always extend in the direction of the horizontal axis of the vessel and the points at which the crane ropes are connected to the suspension tackle are spaced apart in that direction. To permit a lateral movement of the charging box into the enclosure through the charging opening formed in the enclosure in a side wall which is transverse to the horizontal axis of the vessel and subsequently to permit a lateral movement of the charging box to a charging position over the vessel, it will be sufficient to provide in the top wall of the enclosure a relatively narrow opening for receiving the crane ropes, which enter the top wall opening in succession in the direction in which they are spaced apart. That top wall opening which may be small in area even if the charging box is suspended from a suspension tackle will minimize the escape of flue gas even if that top wall opening remains uncovered throughout its length. In general, however, the top wall opening will be covered in the portion disposed over the space which serves to accommodate the charging box in its waiting or charging position when the charging box is disposed in the respective other position in the enclosure.

An escape even of small quantities of flue gas from the enclosure can be prevented with simple means if exhaust openings communicating with exhausting means are provided under the top wall of the enclosure along the top wall opening of the enclosure at least over the metallurgical vessel so that flue gases which would otherwise escape through the top wall opening can be exhausted. An escape of flue gas through that portion of the top wall opening which is open adjacent to the ropes can be prevented in that air-blasting means are provided for producing an air blast across the top wall opening at least over the metallurgical vessel. Said air-blasting means preferably cooperate with the exhausting means and produce a blast of air which positively urges the evolved flue gases toward the exhaust openings.

DETAILED DESCRIPTION OF THE DRAWING

BRIEF DESCRIPTION OF THE PREFERRED EMBODIMENTS

Figure 1:
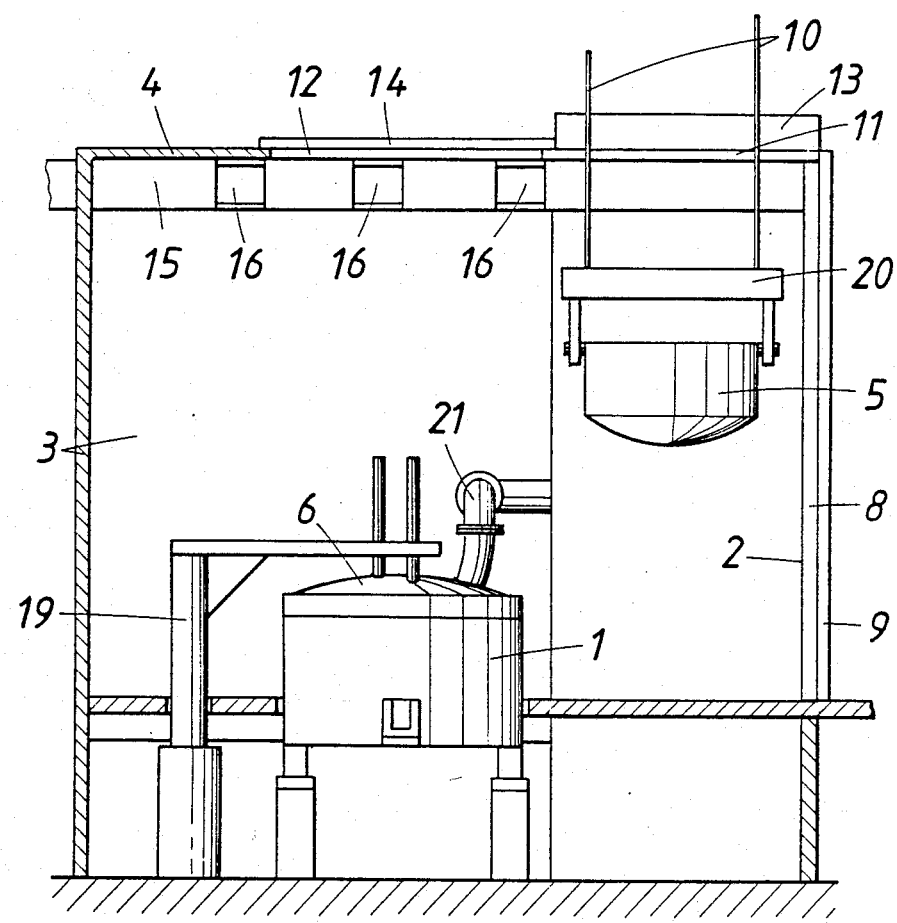
FIG. 1 is a sectional view showing a metallurgical plant in accordance with the invention, the view being taken on a plane which includes the horizontal axis about which the metallurgical vessel is tiltable.

Two embodiments of the invention will now be explained more in detail with reference to the drawing.

The metallurgical plant comprises an open-topped metallurgical vessel or furnace 1 and an enclosure, which surrounds the vessel 1 and comprises side walls 2 and 3 and a top wall 4. The arrangement is such that a charging box 5 which is suspended from a charging crane, not shown, which is disposed outside the enclosure, can remain in a waiting position within the enclosure during opening and closing movements of a cover 6 provided on top of the vessel 1. This is apparent from FIGS. 1 and 3. To accommodate the charging box 5 in its waiting position, a sufficiently large space is required in the enclosure between the metallurgical vessel 1 and the side wall 2. The provision of said space should not render the access to the metallurgical vessel from the outside of the enclosure more difficult. For this reason the charging box 5 in waiting position is disposed beside the metallurgical vessel 1 and is spaced from it in the direction of the horizontal axis about which the vessel is tiltable. As a result, a slag door of the metallurgical vessel 1 will be accessible from the outside of the enclosure through a suitable access door 7 formed in one of the side walls 3 which are adjacent to the side wall 2. The vessel 1 may consist, e.g., of an electric furnace. In such a plant the charging box 5 is moved into the enclosure in the direction of the horizontal axis of the metallurgical vessel 1 through a charging opening 8 in the side wall 2, which is at right angles to the horizontal axis of the vessel 1. Said charging opening 8 can be closed by means of a two-leaf shutter 9.

The ropes 10 of the charging crane extend through a top wall slot 11, which is formed in the top wall 4 of the enclosure and is open to and extends from the charging opening 8 formed in the side wall 2 to the region over the metallurgical vessel 1. In said region over the metallurgical vessel 1, said top wall slot 11 is continued by an enlarged access opening 12, through which, e.g., the cover 6 of the vessel 1 can be introduced into and removed from the enclosure. The top wall slot 11 and the access opening 12 are adapted to be closed by respective shutters 13 and 14 so that the enclosure surrounding the metallurgical vessel 1 can be entirely closed and the flue gas evolved during the charging of the vessel, during tapping or during a removal of slag, can be sucked off within the enclosure and a pollution outside the enclosure can thus be avoided. The exhausting means substantially comprise exhaust ducts 15, which extend on the underside of the top wall 4 along the top wall slot 11 and are formed with exhaust openings 16. As is apparent from FIG. 2 the exhaust openings 16 are particularly disposed over the tap ladle 17 and the slag ladle 18.

Figure 2:
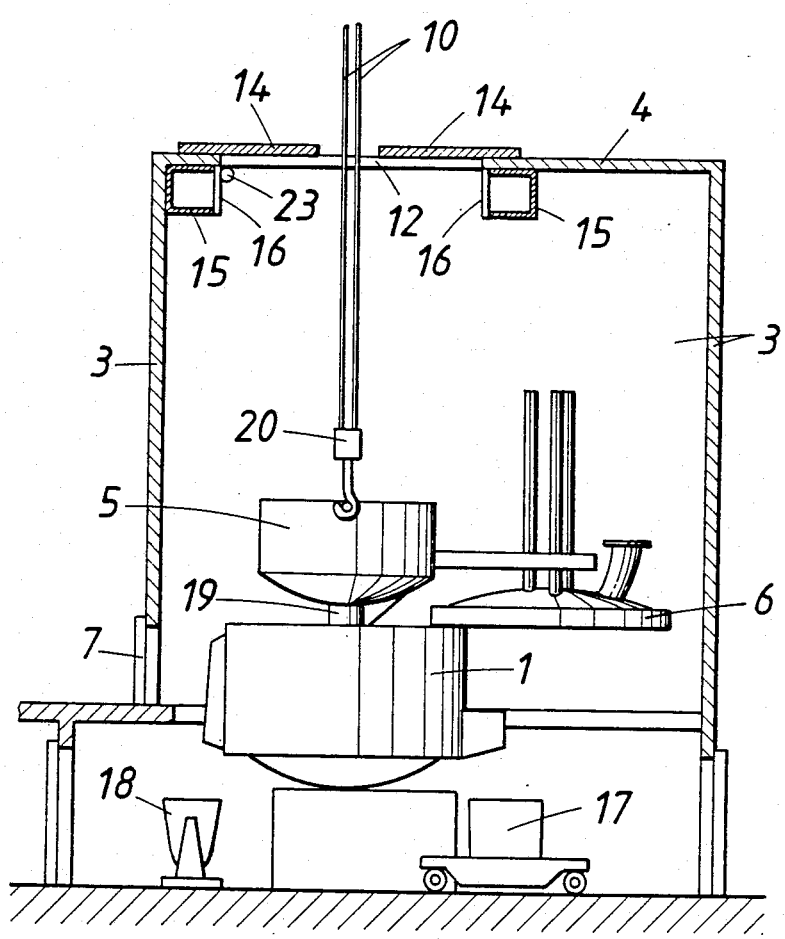
FIG. 2 is a sectional view showing the plant of FIG. 1 and taken on a plane which is transverse to said horizontal axis.
Figure 3:
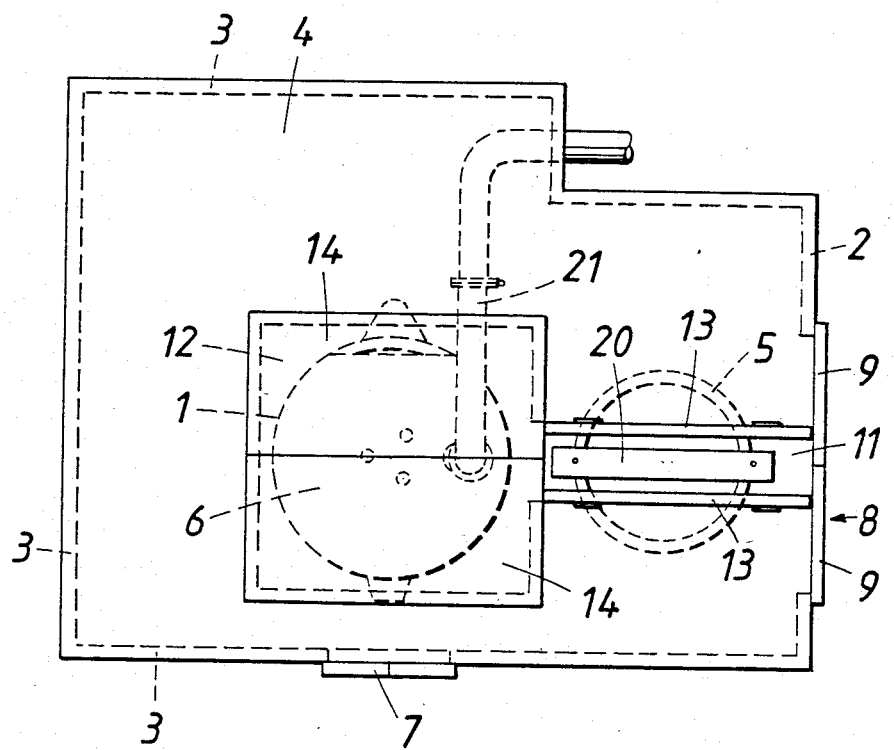
FIG. 3 is a top plan view showing the plant and a charging box in waiting position.

When it is desired to charge the metallurgical vessel 1 by means of the charging box 5, the charging crane is operated to move the charging box 5 through the charging opening 8 into the enclosure until the charging box 5 is in the waiting position shown in FIGS. 1 and 3. Then the shutter 9 is closed and the cover 6 of the vessel is raised and by means of a pivoted arm 19 is pivotally moved away from the vessel 1 to an open position indicated in FIGS. 2 and 4. The shutter 14 for the access opening 12 remains closed during the opening movement of the cover 6 and only the shutter 13 for the top wall slot 11 must remain open at that time to permit the crane ropes 10 to extend through the top wall slot 11. But flue gas cannot escape in substantial quantities through the top wall slot 11 because it is relatively narrow. It must be borne in mind that the top wall slot 11 need not be wide even if the charging box 5 is suspended from the crane ropes 10 by means of a suspension tackle 20 because said suspension tackle 20 extends in the direction of the horizontal axis of the metallurgical vessel 1 and the crane ropes 10 are connected to said suspension tackle at points which are spaced apart in that direction. As a result, during a movement of the charging box 5 in the direction of the horizontal axis of the metallurgical vessel 1 the crane ropes 10 will successively enter the top wall slot 11 so that is sufficient to provide said top wall slot 11 in a width which would otherwise be required for a single crane rope.

Figure 4:
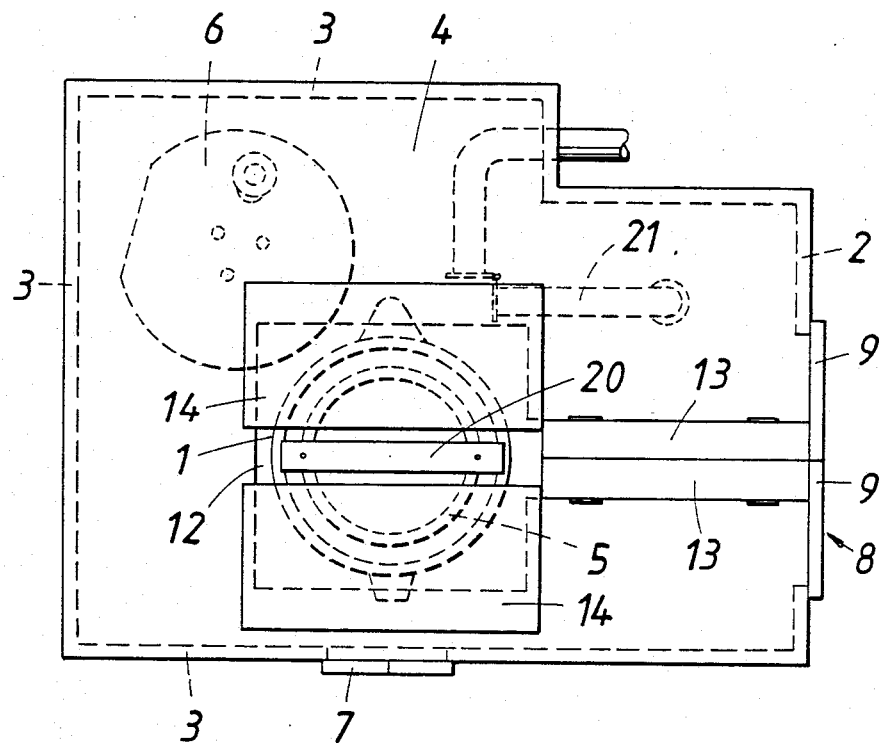
FIG. 4 is a top plan view that is similar to FIG. 3 but with the charging box in charging position.

When the cover 6 has been opened the charging box 5 is moved from its waiting position to a charging position over the furnace vessel 1. This is illustrated in FIGS. 2 and 4. For that purpose the shutter 14 must be opened at least to such an extent that the crane ropes 10 can move through the thus opened gap between the two shutters 13 and 14. During the charging of the vessel 1 the shutter 13 for the top wall slot 11 can be closed. When the vessel has been charged, the operations described hereinbefore are performed in the reverse sequence so that the charging box is returned to its waiting position. Now the cover 6 can be closed before the charging box is moved out of the enclosure.

An exhaust pipe 21 may be provided, which is adapted to be connected to the cover 6. Such an exhaust pipe 21 may be pivotally moved from the position shown in FIG. 3 to the position shown in FIG. 4 before the cover 6 is opened. This will provide a free path for the charging box. Alternatively, the exhaust pipe 21 may be stationary and the cover 1 may be pivotally moved away from the exhaust pipe. In that case the charging box 5 must be moved over the exhaust pipe 21 to a charging position.

The shutter 13 for closing the top wall slot 11 may consist of two relatively slidably mounted shutter plates or of two hinged shutter flaps. Similarly, the shutter 14 may consist of two shutter plates which are slidable in mutually opposite directions. When the charging box is to be moved to its charging position it is sufficient to move the plates of the shutter 14 apart to such an extent that they define between them a gap for receiving the crane ropes. Alternatively, the slidable shutter plates of the shutter 14 may be provided at their adjacent edges with hinged shutter flaps, which can be swung open to define between them a gap for receiving the crane ropes whereas the shutter plates of the shutter 14 need not be displaced for that purpose. Such shutter flaps are indicated in FIGS. 1 and 2.

Figure 5:
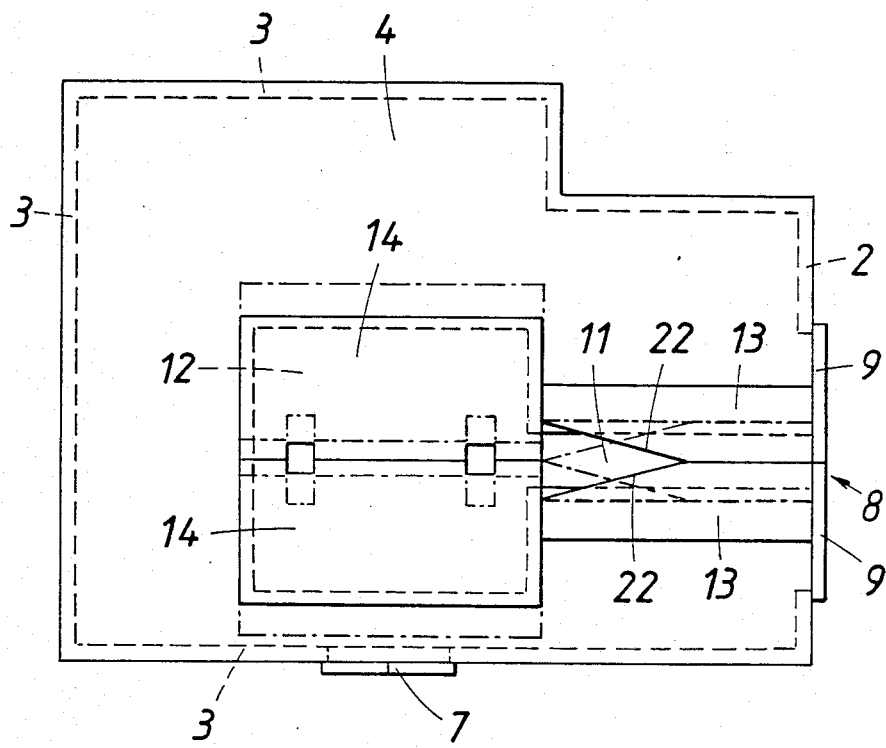
FIG. 5 is a top plan view showing a plant having different means for closing the top wall opening of the enclosure.

Because the escape of flue gas from the enclosure should be minimized, the top wall slot 11 in the top wall 4 may be closed except for those portions which contain the crane ropes. A particularly desirable embodiment of a shutter 13 is shown in FIG. 5. In that embodiment the shutter 13 consists of two slidable plates, which have confronting edges 22 which are inclined at equal and opposite angles so that the top wall slot 11 can be progressively closed during the movement of the charging box 5 to its charging position in that the two shutter plates 13 are displaced one over the other to an extent depending on that movement of the charging box. When the charging box 5 is in charging position and in waiting position, the top wall slot 11 and the access opening 12 can be closed even between the crane ropes 10 because the charging box 5 is not laterally moved when it is in said positions.

To ensure that flue gases being evolved will not escape through the slot 11 formed in the top wall 4 of the enclosure, the exhaust ducts 15 formed with the exhaust openings 16 extend on the underside of the top wall 4 along said top wall slot and along the access opening 12. Besides, a blast nozzle 23 (FIG. 2) may be provided on the underside of the top wall 4 on one side of the top wall slot 11 and may be operated to produce an air blast across the top wall slot 11. The air blast can be exhausted through the exhausting means. Said air blast will deflect flue gases toward the exhausting means so that an escape of flue gas from the enclosure will be prevented.

We claim:
1. A metallurgical plant comprising:
   (a) a metallurgical vessel having an open top and being mounted for tilting about a horizontal axis extending in a predetermined direction,
   (b) a cover adapted to be pivotally moved between an open position exposing the open vessel top and a closed position closing the open vessel top,
   (c) actuating means for lifting the cover from the open vessel top and for pivotally moving the cover along a predetermined path from the closed to the open position to permit the vessel to be charged,
   (d) a charging box for charging the vessel,
   (e) two crane ropes suspending the charging box and spaced from each other in alignment in the direction of the horizontal tilting axis of the metallurgical vessel,
   (f) an enclosure surrounding the vessel and the cover in the open and closed positions, the enclosure comprising
      (1) a side wall extending transversely to the horizontal tilting axis and having a charging opening through which the charging box suspended from the two crane ropes is adapted to be laterally moved into the enclosure to a charging position over the vessel, the side wall and the vessel defining a space therebetween for accommodating the charging box in a waiting position in which the charging box clears the predetermined path for movement of the cover between the open and closed positions so that the cover is moved between the open and closed positions while said charging box is in the waiting position in said enclosure, and
      (2) a top wall extending over the vessel from the side wall, the top wall defining an elongate top wall opening extending in the direction of the horizontal tilting axis of the metallurgical vessel and adapted to receive the two aligned crane ropes as the charging box is laterally moved into the enclosure, the elongate top wall opening communicating with the side wall charging opening and extending at least as far as a vertical center line of the metallurgical vessel,
   (g) first and second shutter means selectively operable to close the charging and top wall openings, respectively said first and second shutter means defining an elongated, minimally open slot capable of receiving and closely surrounding the aligned crane ropes of the charging box so as to minimize the escape of flue gases from the vessel during charging,
   (h) exhaust means extending on an underside of the top wall and having exhaust openings along the elongated top wall slot, and
   (i) air-blasting means arranged on the underside of the top wall and operable to produce an air blast across the elongated top wall slot.

* * * * *